(12) United States Patent
Rothfuss

(10) Patent No.: US 9,638,359 B2
(45) Date of Patent: May 2, 2017

(54) STRIP WOUND HOSE

(71) Applicant: Witzenmann GmbH, Pforzheim (DE)

(72) Inventor: Daniel Rothfuss, Straubenhardt (DE)

(73) Assignee: Witzenmann GmbH, Pforzheim (DE)

( * ) Notice: Subject to any disclaimer, the term of this patent is extended or adjusted under 35 U.S.C. 154(b) by 0 days.

(21) Appl. No.: 15/011,771

(22) Filed: Feb. 1, 2016

(65) Prior Publication Data

US 2016/0230908 A1 Aug. 11, 2016

(30) Foreign Application Priority Data

Feb. 10, 2015 (DE) .......................... 10 2015 101 982

(51) Int. Cl.
*F16L 11/16* (2006.01)
*F01N 13/18* (2010.01)
*B26D 7/08* (2006.01)

(52) U.S. Cl.
CPC ................ *F16L 11/16* (2013.01); *B26D 7/08* (2013.01); *F01N 13/1816* (2013.01)

(58) Field of Classification Search
USPC ......................................... 138/134, 135, 136
See application file for complete search history.

(56) References Cited

U.S. PATENT DOCUMENTS

| | | | | |
|---|---|---|---|---|
| 919,001 A * | 4/1909 | Greenfield | ............... | F16L 11/16 138/131 |
| 2,152,588 A * | 3/1939 | Griesemer | ........... | B67D 7/3236 138/134 |
| 3,041,855 A * | 7/1962 | Hanlein | ................ | A44C 5/0076 138/111 |
| 3,204,666 A * | 9/1965 | Lindsay | ................ | F16L 59/153 138/135 |
| 4,630,649 A * | 12/1986 | Oku | .................... | G02B 23/2476 138/122 |
| 5,096,521 A * | 3/1992 | Schouten | ................ | F16L 11/16 138/134 |
| 5,259,418 A * | 11/1993 | Hamrick | ............... | B29B 13/024 116/207 |
| 7,055,551 B2 * | 6/2006 | Fraser | ................... | B21C 37/154 138/132 |

(Continued)

FOREIGN PATENT DOCUMENTS

DE 102011110219 2/2013
EP 0246360 11/1987

(Continued)

*Primary Examiner* — James Hook
(74) *Attorney, Agent, or Firm* — Volpe and Koenig, P.C.

(57) ABSTRACT

A strip wound hose is provided including a metal band with an approximately S-shaped profile, which is wound in helical windings to form a hose. The profile of the metal band includes two wall sections extending essentially axially and being radially spaced part from each other, which are connected to each other by a web and are each provided at the edge with a bent rim. The profiles of two adjacent windings each are mutually engaged via their rims such that they are axially movable in reference to each other between a compressed position and an extended position. Both the web as well as the rims of the profile are aligned diagonally by an angle of at least 10 degrees in reference to the radial direction. A method for cutting to length and/or widening the strip wound hose is also provided.

7 Claims, 2 Drawing Sheets

(56) References Cited

U.S. PATENT DOCUMENTS

2008/0012297 A1* 1/2008 Heil .................... F01N 13/1816
                                                        285/226
2013/0233433 A1    9/2013 Hof et al.

FOREIGN PATENT DOCUMENTS

EP       0503369       9/1992
EP       0561211       9/1993
WO       2011073686    6/2011

* cited by examiner

STRIP WOUND HOSE

INCORPORATION BY REFERENCE

The following documents are incorporated herein by reference as if fully set forth: German Patent Application No. 102015101892.6, filed Feb. 10, 2015.

BACKGROUND

The present invention relates to a strip wound hose comprising a metal band having an approximately S-shaped profile, which is wound in helical windings to form a hose. The profile of the metal band exhibits two wall sections, essentially extending axially and radially spaced apart from each other, which are connected to each other by a web and respectively provided at their edges with a bent rim. The profiles of two adjacent windings of the strip wound hose are mutually interlocked via their rims such that they are axially mobile between a compressed position and an extended position.

The invention further relates to a method for widening and/or cutting to length such a strip wound hose.

Strip wound hoses of the above-mentioned type have been known for quite some time. The axial mobility of the individual windings in reference to each other provides the strip wound hoses with great mobility, yet still showing high mechanic strength of the profiled windings. For the production of such strip wound hoses, initially a metal band is deformed by profiling via several pairs of profiled rolls into an essentially S-shaped profile such that particularly the edge of the rims are angularly aligned opposite each other. The profiled metal band is then wound onto a rotating winding mandrel, with the oppositely angled rims each loosely engaging two adjacent windings.

Strip wound hoses are known from prior art with their windings having a hook-shaped profile. The band edges of the profiled metal band are here simply folded so that bent rims develop, loosely interlocked with adjacent windings. The individual windings loosely engage each other and can move in reference to each other axially between the compressed position and the extended position. Strip wound hoses with a hook-shaped profile show the greatest mobility among the strip wound hoses.

Additionally, strip wound hoses are known from prior art with their adjacent windings being loosely rebated to each other by the profiled metal band showing the form of a rebated or agraffe profile. Here, the rims of the metal band profile are not only bent in one direction, but also bent reversely to a certain extent so that they mutually engage loosely with appropriately reversely bent rims of an adjacent winding and form a type of mobile form-fitting connection.

In strip wound hoses with rebated or agraffe profiles, the profiles of two adjacent windings can also move axially between a compressed position and an extended position. The mutually rebated profile however significantly limits the axial path of motion and the internal friction between the individual windings moved axially in reference to each other is several times higher than that of a hook-shaped profile. In return, a strip wound hose with a rebated or agraffe profile is more resilient than a strip wound hose with a hook-shaped profile and can easily be mechanically widened, for example.

The higher mobility and lower interior fraction of a strip wound hose with a hook-shaped profile is desired for many applications of strip wound hoses. Only as an example, here the use of a strip wound hose is mentioned within a flexible conduit for the exhaust system of a motor vehicle, described for example in DE 103 40 983 A1. Here the strip wound hose is used as a liner inside a metal bellows for conducting the flow of the gases guided through. In addition to conducting the flow, the liner also serves for the thermal protection of the metal bellows from the generally very hot exhaust from the internal combustion engine guided through.

Here, the connection of the strip wound hose inside the flexible conduit is problematic. By the coaxial arrangement of the liner and the metal bellows the liner must be widened in the proximity of the rims of the metal bellows in order to allow fastening it directly or indirectly at the rims of the bellows. The widening of the strip wound hose with a hook-shaped profile is however most problematic, because here the risk is given that adjacent windings involved can disengage and lose their mutual grip.

This problem is given in all strip wound hoses with a hook-shaped profile, which are widened, regardless of their respective application. Furthermore, strip wound hoses with a hook-shaped profile, which are commonly produced and transported as bulk goods and cut to length for the production of a conduit, show the unpleasant feature that a simple cut leads to projecting ends (gores), which are problematic for further processing.

Both when cutting as well as when widening strip wound hoses with a hook-shaped profile here particular provisions must be implemented, such as the use of additional sheaths, for example.

SUMMARY

The present invention is based on the objective of providing a strip wound hose which shows a higher degree of mobility and/or lower interior friction than a strip wound hose with rebated or agraffe profiles, which is simultaneously more easily cut to length and/or widened than a strip wound hose with a hook-shaped profile according to prior art. Another objective is given in suggesting a method for cutting to length and/or widening a strip wound hose.

These objectives are attained in a strip wound hose or tube and a method having one or more features of the invention.

Accordingly, a strip wound hose according to the invention comprises a metal band with an approximately S-shaped profile, which is wound in helical windings to form a hose, with the profile of the metal band essentially having two axially extending, radially spaced apart wall sections, which are connected to each other by a web and each provided at the edges with a bent rim. The profiles of two adjacent windings are mutually engaged via their rims such that they are axially mobile in reference to each other between a compressed position and an extended position. Both the web as well as the rims of the profile are aligned diagonally by an angle of at least 10 degrees in reference to the radial direction, with the rims of the profile forming between themselves and the corresponding axial wall sections preferably an angle from 45 to 80 degrees, particularly preferred an angle from 45 to 75 degrees. The rims are therefore bent in reference to the metal band by an angle of more than 90 degrees, however they are not bent reversely to such an extent that a strip wound hose with a rebated profile results. The strip wound hose according to the invention further exhibits the high mobility of a strip wound hose with a hook-shaped profile.

An essential feature of the present invention is given in the diagonal positioning of both the two rims as well as the web of the profiled metal band, with the web preferably having approximately the same diagonal position as the rims of the profiled metal band. Accordingly, it shows preferably an angle from 100 to 135 degrees in reference to the two axial wall sections.

Based on the diagonal positions according to the invention of both the rims as well as the web of the profiled metal band it is possible to perform the method according to the invention for cutting to length and/or widening the strip wound hose: according to the invention for this purpose the strip wound hose is radially compressed in a compression area such that the rims of two adjacent windings after the compression form an angle of less than 45 degrees between themselves and the corresponding axial wall sections, and subsequently the strip wound hose is cut to length and/or widened in the compressed area.

The diagonal position of the rims and the additionally given diagonal position of the web allow such a radial compression, because during the radial compression the web, which was already positioned diagonal at the beginning, moves at least partially into a flat position, and simultaneously the rims are seamed to each other in an agraffe profile. The latter is supported by the flattening of the web and the corresponding widening of the profile of the metal band. Simultaneously the resistance of the profile against the radial compression reduces by the diagonal positioning of the web, and by the flattening of the web reproducible conditions result during the radial compression.

The strip wound hose according to the invention deforms during the implementation of the method according to the invention in the compressed area into a relatively motion-stable, form-fittingly rebated strip wound hose, which can be easily widened as well as easily cut to length; the latter for example by the use of laser cutting machines. During the widening process, the engagement of two adjacent windings of the strip wound hose to each other remains, because based on the geometry of the strip wound hose according to the invention, the radial compression reliably leads to radial overlaps of the individual windings.

Within the scope of the method according to the invention it is essential to perform the widening or cutting to length of the strip wound hose within the compression area, thus not widening the entire compressed area, for example.

The advantages according to the invention can be achieved in a particularly secure fashion when the profile of the metal band of the strip wound hose according to the invention shows a moderate wave height, which is greater than one fourth of a profile width, which is essentially equivalent to a maximum axial extension of the profile. The wave height is here essentially equivalent to the radial extension of a bent rim, which is generally slightly smaller than the radial distance between the two axial wall sections of the profile. Such a preferred geometry of the profiled metal band allows a radial compression according to the invention for the purpose of widening and/or cutting to length the strip wound hose without special measures during the compression being required; with this geometry the desired radial overlap of the adjacent profiles develops automatically during the radial compression.

An uncomplicated radial compression allows for the strip wound hose according to the invention also that a mean length of the rims of the profile to be greater than half the mean length of the axial wall sections of the profile when it is formed accordingly, which is preferred within the scope of the present invention. This way a radial overlap and thus a form-fitting mutually engaging seaming of the rims of two adjacent windings of the strip wound hose is ensured, without it being required here to meet particular edge conditions during the radial compression process.

As known per se, it is also preferred within the scope of the present invention for the profile of the metal band to be embodied essentially in a rotary-symmetrical fashion, with the point of symmetry generally being located in the middle of the web.

A particularly preferred use of the strip wound hose according to the invention is given in that it is arranged inside a metal bellows and this way creates a flexible conduit, which is used particularly in an exhaust line of an internal combustion engine. Here it is preferred to radially compress the strip wound hose in the proximity of the rim of the metal bellows using the method according to the invention and to widen the strip wound hose within the here generated compressed area in order to then allow directly or indirectly connecting it to the rim of the bellows, while it still extends inside the metal bellows radially at a distance therefrom and here its particularly high mobility is relevant.

BRIEF DESCRIPTION OF THE DRAWINGS

In the following, the present invention is further illustrated based on an exemplary embodiment for a strip wound hose embodied according to the invention, shown only as an example in the attached figures. Shown are.

DETAILED DESCRIPTION OF THE PREFERRED EMBODIMENT

Figure 1:
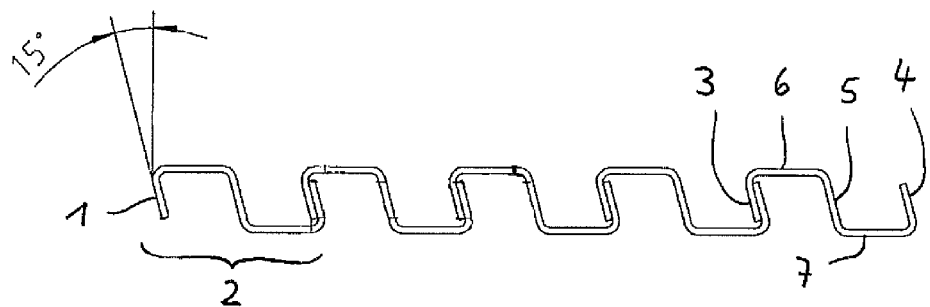
FIG. 1 a cross-section through a wall of a strip wound hose embodied according to the invention in an extended position.
Figure 2:
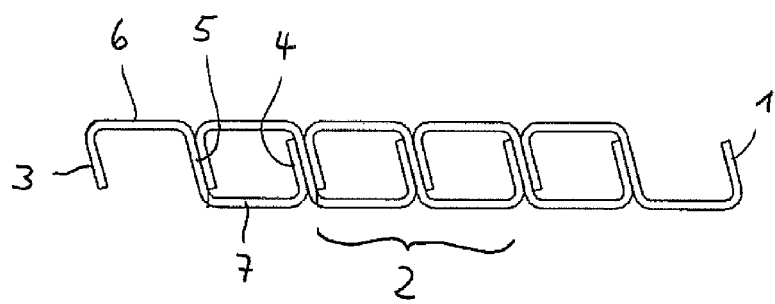
FIG. 2 a cross-section like FIG. 1, however in a compressed position of the strip wound hose.
Figure 3:
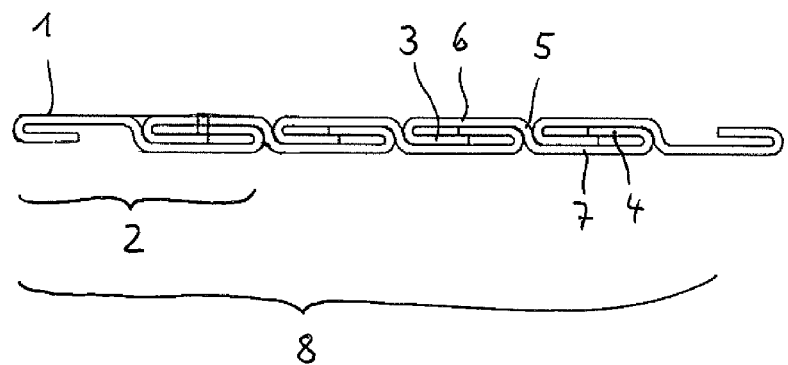
FIG. 3 a cross-section like FIG. 1, however after a radial compression of the section of the strip wound hose shown.
Figures 4A, 4B:
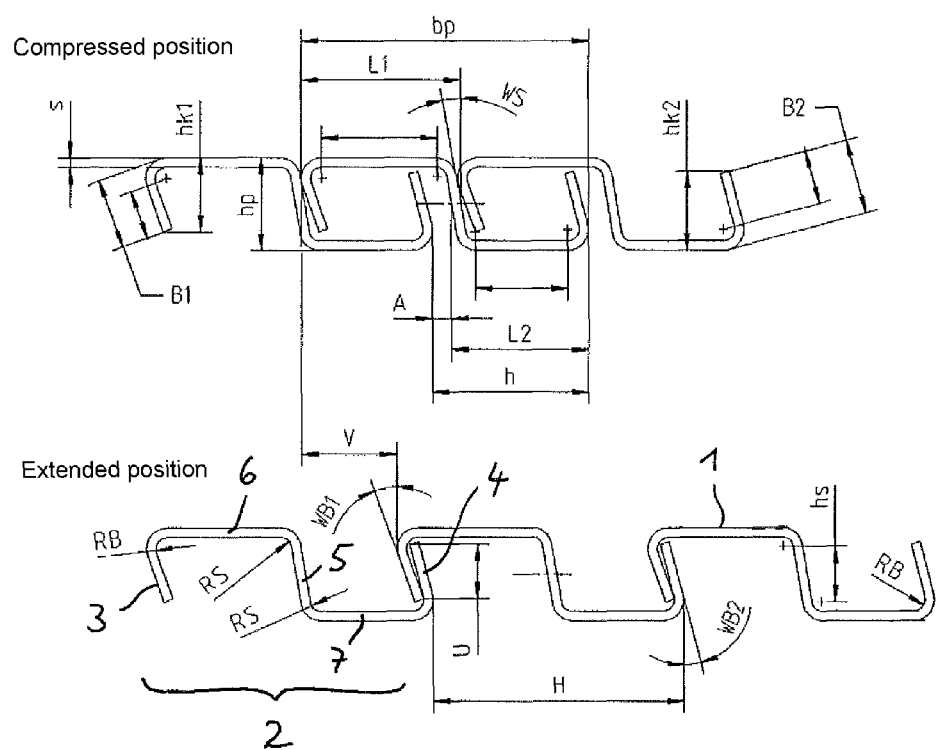
FIGS. 4A and 4B two cross-sections like FIGS. 1 and 2, with a slightly modified embodiment of the strip wound hose according to the invention, in order to illustrate the nomenclature.

The section of a strip wound hose shown in FIGS. 1 to 4A and 4B comprises several windings 2 of a profiled metal band 1. The profile exhibits two axially extending wall sections 6, 7, which are connected to each other via a web 5. At the edge, the profiled metal band 1 is provided respectively with a bent rim 3, 4, by which two adjacent windings 2 of the profiled metal band 1 are engaged with each other, so that the windings 2 can be moved in reference to each other between a compressed position (FIG. 2, FIG. 4A) and an extended position (FIG. 1, FIG. 4B).

FIGS. 4A and 4B show a cross-section through a part of the strip wound hose embodied according to the invention in the compressed position (FIG. 4A) and/or extended position (FIG. 4B), with the strip wound hose shown here comprising a profiled metal band 1, with its profile not being embodied in a rotationally symmetric fashion. Based on these illustrations, the nomenclature used within the scope of this description is illustrated, and includes:

s Band thickness of the metal band
hp profile height
bp profile width
L1 first wave length
L2 second wave length
B1 first rim length
B2 second rim length H pitch of the strip wound hose in the extended position
h pitch of the strip wound hose in the compressed position
V axial displacement path between the compressed position and the extended position
U overlap
A asymmetry
RB rim radius
RS web radius
hs height of web
WS angle of web
WB1 first rim angle
WB2 second rim angle
hk1 first wave height
hk2 second wave height.

The exemplary embodiment of the strip wound hose according to the invention shown in FIGS. 1 and 2 is however embodied in a symmetric fashion, i.e. the profile of each winding 2 of the metal band 1 is shaped symmetrical to a point such that the first wave length L1 and the second wave length L2 as well as the first rim length b1 and the second rim length b2 are respectively identical. This is preferred in reference to the exemplary embodiment of FIGS. 4A and 4B.

Furthermore, the profile of the strip wound hose, shown in FIG. 1 in the extended position and in FIG. 2 in the compressed position, is also symmetrically designed such that the diagonal position of the two rims 3, 4 is identical to the diagonal position of the web 5 of the profile, i.e. it is true: WB 1=WB2=WS. In the present exemplary embodiment it is further true: WB1=WB2=WS=15°. This leads here to both rims 3, 4 form between each other and the respectively corresponding axial wall section 6, 7 an angle of 90°−WB1=90°−15°=75 each, while the web 5 shows an angle of 90°+WS=90°+15°=105° in reference to the axial wall sections 6, 7.

By the identical angles of both rims 3, 4 as well as the web 5, in spite of the diagonal positioning according to the invention, a maximum displacement path is given between the extended position shown in FIG. 1 and the compressed position of the strip wound hose shown in FIG. 2. The exemplary embodiment shown in FIGS. 1 and 2 of the strip wound hose according to the invention therefore shows the full mobility of a strip wound hose with a hook-shaped profile.

By the simple radial compression of the strip wound hose shown in FIGS. 1 and 2 a compressed section 8 develops, which is shown in FIG. 3. The two rims 3, 4 of two adjacent windings 2 of the profile have essentially flattened, increasing the angle WB1 and/or WB2, so that the individual windings 2 of the strip wound hose form a stable form-fitting connection with each other. The web 5 has partially assumed a flat position by the compression, causing the axial wall sections 6, 7 to lengthen accordingly; by the doubling of material in the proximity of the rims 3, 4, which are radially overlapping and seamed, ultimately a remnant of the web 5 is left, which connects the axial wall sections 6, 7, which still are slightly radially spaced apart from each other.

As illustrated in FIG. 3, the compressed area 8 shown here of the radially compressed strip wound hose shown in FIGS. 1 and 2 can easily be widened within the compressed section 8, without compromising the connection of two adjacent windings of the profile 2. Here, an uncomplicated cutting to length within the compressed section 8 is also possible.

The invention claimed is:

1. A strip wound hose, comprising a metal band (1) with an approximately S-shaped profile, which is wound in helical windings (2), a profile of the metal band (1) comprising two essentially axially extending wall sections (6,7), radially spaced apart from each other, which are connected to each other by a web (5) and which are each provided at an edge with a bent rim (3,4), and with the profiles of two adjacent ones windings (2) respectively being mutually engaged via said respective rims (4,5) such that the adjacent windings are axially movable in reference to each other between a compressed position and an extended position, wherein both the web (5) as well as the rims (3,4) of the profile (2) are aligned diagonally by an angle of least 10 degrees in reference to a radial direction, with the rims being set at a closed angle to the axially extending wall sections, and a height (hk1, hk2) of a wave of the profile, which is essentially equivalent to a smaller of a radial extension of the rims (3,4), is greater than one fourth of a width of a profile (bp), which is essentially equivalent to a maximum axial extension of the profile.

2. The strip wound hose according to claim 1, wherein the rims (3, 4) of the profile form between themselves and the corresponding axially extending wall sections (6, 7) an angle from 45 to 80 degrees.

3. A strip wound hose according to claim 1, wherein a mean length (B1, B2) of the rims (3,4) of the profile (2) is greater than half of a mean length (L1, L2) of the axial wall sections (6,7) of the profile.

4. A strip wound hose according to claim 1, wherein the profile is essentially rotationally symmetric.

5. A flexible conduit comprising the strip wound hose according to claim 1 located in flexible conduit with a metal bellows coaxially surrounding the strip wound hose.

6. The flexible conduit comprising the strip wound hose according to claim 5, wherein the strip wound hose is widened and in the widened section directly or indirectly connected to the metal bellows.

7. A method for at least one of cutting to length or widening a strip wound hose, comprising:
providing the strip of wound hose comprised from a metal band (1) having an approximately S-shaped profile, which is wound in helical windings (2) to form a hose, with the profile of the metal band (1) comprising two essentially axially extending wall sections (6,7), radially spaced apart from each other, which are connected to each other by a web (5) and are each provided at an edge with a bent rim (3,4), and with the profiles of two adjacent ones of the windings (2) mutually engaging each other with the rims (3,4) thereof such that they are axially movable in reference to each other between a compressed position and an extended position,
radially compressing the strip wound hose compressed to form a compressed section (8) in which the rims (3, 4) of two adjacent windings (2) after the compression form between themselves and the corresponding axial wall sections (6, 7) an angle of less than 45 degrees, and
subsequently cutting the strip wound hose to length or widening the compressed section (8) or both.

* * * * *